United States Patent [19]
Chen et al.

[11] Patent Number: 5,569,433
[45] Date of Patent: Oct. 29, 1996

[54] LEAD-FREE LOW MELTING SOLDER WITH IMPROVED MECHANICAL PROPERTIES

[75] Inventors: Ho S. Chen, Lebanon; Sungho Jin, Millington; Mark T. McCormack, Summit, all of N.J.

[73] Assignee: Lucent Technologies Inc., Murray Hill, N.J.

[21] Appl. No.: 335,619

[22] Filed: Nov. 8, 1994

[51] Int. Cl.⁶ .............................. C22C 13/00; C22C 12/00
[52] U.S. Cl. ...................... 420/557; 420/562; 420/577
[58] Field of Search ................................. 420/557, 562, 420/577

[56] References Cited

U.S. PATENT DOCUMENTS 4,236,922  12/1980  Michl et al. ........................... 75/134 D
5,368,814  11/1994  Gonya et al. ........................... 420/577

*Primary Examiner*—Sikyin Ip
*Attorney, Agent, or Firm*—Glen E. Books

[57] ABSTRACT

We have made the surprising discovery that small amounts of Ag below 1% by weight are effective in making Bi—Sn alloys less strain-rate sensitive without deleteriously affecting the melting character of the alloy. A Pb-free solder composition comprising at least 40% by weight Bi, between 40% and 60% Sn, and between 0.05 and 1% Ag is effective to increase the total elongation of the solder by at least 20% under the same processing conditions. Moreover the solder is free of undesirable Ag-containing phases with a melting point in excess of the 183° C. melting point of the Pb—Sn binary eutectic alloy. In a preferred embodiment, the composition comprises 54.75% Bi, 45% Sn, and 0.25 % Ag.

2 Claims, 3 Drawing Sheets

ELONGATION VS Sn CONTENT AT 0.5%Ag DOPING
HIGH STRAIN RATE OF $10^{-2}$/SEC

ELONGATION VS Ag CONTENT AT 45%Sn
HIGH STRAIN RATE OF $10^{-2}$/SEC

54.5Bi-45Sn-0.5Ag Slow Cool

20 μm

58Bi-42Sn Slow Cool

20 μm

54.5Bi-45Sn-0.5Ag Fast Cool

20μm

58Bi-42Sn Fast Cool

20μm

LEAD-FREE LOW MELTING SOLDER WITH IMPROVED MECHANICAL PROPERTIES

FIELD OF THE INVENTION

This invention relates to Pb-free, Bi—Sn—Ag solder alloys with improved mechanical properties and to articles bonded therewith.

BACKGROUND OF THE INVENTION

Solder bonds are critical in many electronic devices. The current most widely used solder is the eutectic 37% Pb-63% Sn alloy (all compositional percentages are by weight) with a melting point of 183° C. However, the presence of lead in this solder, as well as its relatively high melting point, have generated substantial interest in replacing it with alternative solder alloys. The toxicity of Pb in industrial processes and in waste at the end of product life is a great environmental concern. Moreover there is a trend in the manufacture of electronic devices to use printed wiring boards and electronic components made out of materials that are less expensive but more temperature sensitive. Solder alloys that are lower in melting point than Pb—Sn solders are needed in order to prevent board warpage and material degradation in manufacture.

One Pb-free alloy that has generated much interest is the binary eutectic 58% Bi-42%Sn alloy (m.p. 138° C.). While solder alloys based upon the Bi—Sn eutectic are promising from both environmental and economic points of view, there are concerns with the severe strain-rate sensitivity of the alloy, i.e. the loss of ductility at high strain rates. See, for example, S. Pattanaik and V. Raman in "Deformation and Fracture of Bismuth-Tin Eutectic Solder," *Materials Development in Microelectronic Packaging*, P. J. Singh, Editor, pp. 251–57 (Mateddais Park, Ohio; ASM, 1991 ). Accordingly, there is a need for a lead free, low-melting solder with improved mechanical properties.

SUMMARY OF THE INVENTION

Applicants have made the surprising discovery that small amounts of Ag below 1% by weight are effective in making Bi—Sn alloys less strain-rate sensitive without deleteriously affecting the melting character of the alloy. A Pb-free solder composition comprising at least 40% by weight Bi, between 40% and 60% Sn, and between 0.05 and 1% Ag is effective to increase the total elongation of the solder by at least 20% under the same processing conditions. Moreover the solder is free of undesirable Ag-containing phases with melting points in excess of the 183° C. melting point of the Pb—Sn binary eutectic alloy. In a preferred embodiment, the composition comprises 54.75% Bi, 45% Sn, and 0.25% Ag.

BRIEF DESCRIPTION OF THE DRAWINGS

The advantages, nature and various additional features of the invention will appear more fully upon consideration of the illustrative embodiments now to be described in detail in connection with the acompanying drawings. In the drawings.

DETAILED DESCRIPTION

Figure 1:
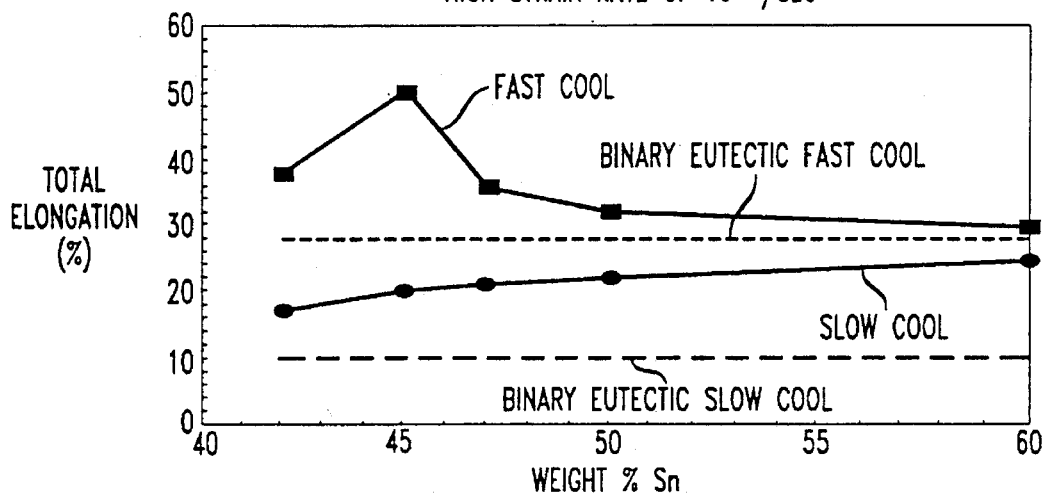
FIG. 1 shows the effect of total elongation as a function of Sn content for Bi—Sn alloys containing 0.5% Ag.

Applicants have discovered Pb-free solder alloys based on the Bi—Sn—Ag system which have substantially improved ductility at high deformation rates over that of binary Bi—Sn alloys. The addition of small amounts of less than or equal to about 1.0% Ag (by weight) and preferably less than or equal. to 0.5% Ag improves the mechanical properties of Bi—Sn solder while having essentially no deleterious effect on the melting character of the alloy. Specifically, in these solder alloys, the high strain-rate ductility in tensile testing of the alloy at a strain rate of $10^{-2}$ $sec^{-1}$ exceeds by at least 20% that of a 58% Bi-42% Sn binary eutectic solder solidified at the same cooling rate. The silver content should be kept below about 1% by weight in order to provide the desired low melting point. Desirable composition ranges for the Bi—Sn—Ag— containing alloys are: Sn in the range 40–60%, more preferably 40–58%, and even more preferably 42–55% Ag in the range 0.01–1.0%, more preferably 0.05–0.75%, and even more preferably 0.05–0.50%, with the remainder of the alloy comprising Bi as the major component. All percentages herein are weight %. The liquidus temperature of all phases present is below 183° C. and below 150° C. in the preferred compositions. Small amounts of metallic elements such as Au, Cu, In, Ni, Pd, Sb, or Zn may be present in small amounts with no deleterious effects.

The Pb-free alloys may be prepared by any number of different ways known to those skilled in the art, e.g., by melting of a mixture of elemental or partially alloyed metals. The alloys may also be prepared by mechanical alloying or by deposition into thin or thick films by electrochemical processes such as electroplating, electroless plating and electrophoresis. Chemical processes such as chemical vapor deposition, or physical vapor deposition such as evaporation or sputtering may also be used.

The Pb-free alloys may be shaped by any appropriate method into articles in the form of wires, ribbons, bars, preforms, solder paste or cream containing alloy powder, suitable flux material, and other chemical constituents. The solder alloys can be used in the manufacture of articles (e.g., surface mounted circuit boards or laser chips solder-bonded to a sub-mount), e.g., by wave soldering, dip soldering, or laser soldering. Alternatively, reflow soldering of solder paste, or deposited and patterned solder layers can also be used.

EXAMPLES

Example 1

A 57.5% Bi-42% Sn-0.5% Ag alloy was prepared from high purity, elemental Bi, Sn and Ag. The alloy was formed by melting under argon atmosphere within a sealed quartz tube having an inside diameter of 14 mm and held at 800° C. for 1 hr before allowing to solidify at room temperature. The molten alloy was vigorously shaken repeatedly at this elevated temperature to ensure compositional homogeneity. The resulting ingot was then upcast into 3 mm inner diameter quartz tubes. These 3 mm rods were then cut into sections and remelted within 4 mm inner diameter quartz tubes in an argon atmosphere at 300° C. for 5 minutes. Some of the specimens were then allowed to slowly cool in air to room temperature, while the other specimens were cooled fast with air blasts using forced-air guns. The thus produced rods were then machined into tensile specimens with a 0.5 inch gauge length and 0.120 inch gauge diameter. Room temperature tensile tests were performed at a high deformation rate of $10^{-2} sec^{-1}$. The slow cooled specimens had a total elongation of 18% (an increase of 80% over that of a similarly made Ag-free composition) and the fast cooled specimens had a total elongation of 38% (an increase of 36% over that of the Ag-free composition). No appreciable change in melting character due to the 0.5% Ag addition was observed by differential scanning calorimetry.

Example 2

Alloy specimens with a fixed Ag content of 0.5% were prepared as in Example 1 with Sn content varying from 42% Sn to 60% Sn and the remainder of the composition being essentially Bi. The results are plotted in FIG. 1. The total elongation for both slow cooled and fast cooled specimens is superior for the Ag-containing specimens when compared to the binary eutectic. No appreciable change in melting character due to the 0.5% Ag addition was observed by differential scanning calorimetry.

Example 3

Figure 2:
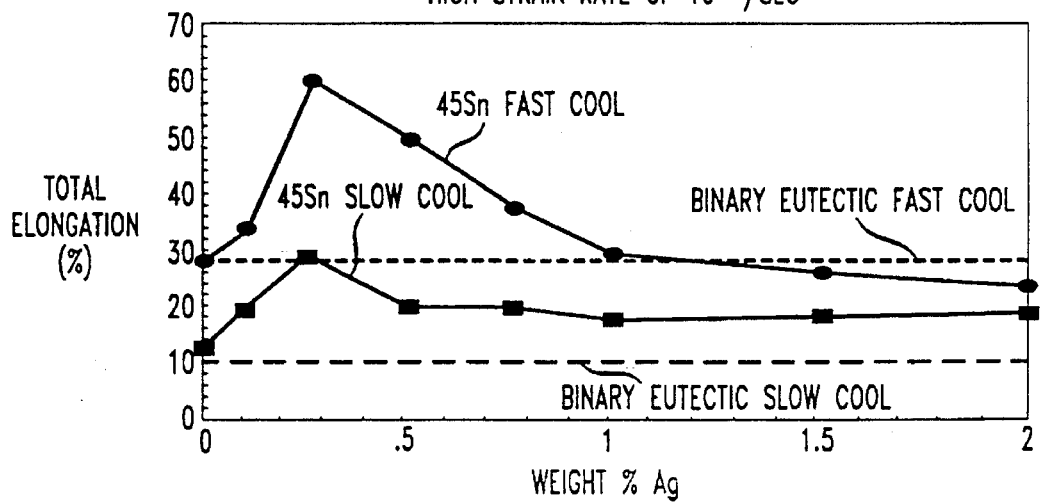
FIG. 2 shows the effect of total elongation as a function of Ag content for Bi—Sn alloys containing 45% Sn.

Alloy specimens with a fixed Sn content of 45% were prepared as in Example 1, with the Ag content varying from 0% to 2%. The results are shown in FIG. 2. At 0.25% Ag, the slow cooled samples had an over 300% increase in ductility, while the fast cooled specimens had an over 200% increase in ductility. The improvement in mechanical properties was appreciable, especially in the case of fast cooling rates, only within the narrow composition range of the Ag content below 1% by weight. No appreciable change in melting character due to the 0.5% Ag addition was observed by differential scanning calorimetry. In contrast, the 1.0% Ag addition introduced an undesirable Ag-containing phase with a liquidus temperature of approximately 180° C. making it necessary to solder at higher temperatures. At 2.0% Ag the liquidus temperature of the Ag-containing phase was approximately 275° C.

Figure 3:
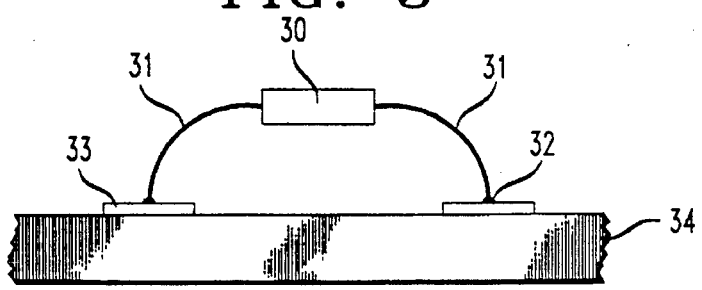
FIG. 3 is a schematic cross section showing circuit components bonded together using Bi—Sn—Ag solder.

The preferred use of these improved solder alloys is to conductively interconnect electronic components such as is shown in FIG. 3 at relatively low soldering temperatures. A first component 30 having one or more leads 31 is bonded by a ball 32 of the improved lead-free alloy to one or more solder-wettable bonding pads 33 of a second component 34 such as a printed wiring board. Component 30 can be any of a wide variety of components such as resistors, capacitors, transistors, integrated circuits, or even a printed wiring board. Lead 31 can be a wire lead of conductive metal such as copper or, alternatively, a conductive layer (not shown) on the bottom of component 30. The pads 33 (which can be thought of as "leads" of component 34) are typically layers of Cu, Cu—Ni—Au, or Cu—Ni—Pd. The alloy ball 32 is the result of soldering lead 31 to pad 33 with a low melting point Pb-free solder as described above and preferably a solder comprising 54.75% Bi, 45% Sn and 0.25% Ag.

The advantage of the interconnected components of FIG. 3 is greater reliability than components connected by conventional higher melting point Pb-free solder. The enhanced mechanical properties of the improved solders produces electronic components with superior resistance to dropping, sudden strains, and poor soldering practice.

Figure 4:
FIGS. 4–7 are photomicrographs of solder layers cooled under slow and fast conditions useful in understanding the nature of the invention.
Figure 5:
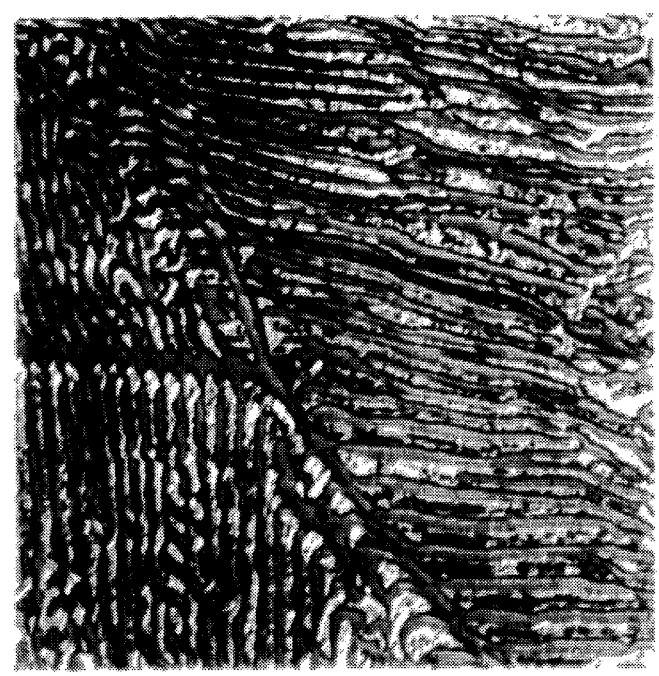
Figure 6:
Figure 7:
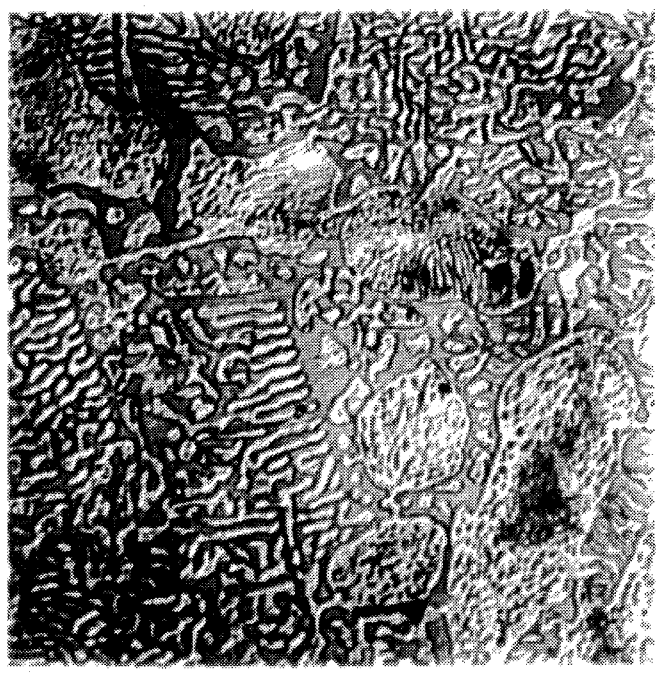

Applicants' present belief is that the above-described solders have superior mechanical properties because the small Ag additions refine the alloy microstructure upon solidification. The effective grain size is reduced by at least 25%, preferably at least 50%, and even more preferably by at least 100% by the Ag additions. This effect is illustrated in photomicrographs (1000×) by comparing the grain size of slow cooled 54.5 Bi-45 Sn-0.5 Ag solder shown in FIG. 4 with that of slow cooled 58 Bi-42 Sn shown in FIG. 5. A similar effect seen comparing the fast cooled 54.5 Bi-45 Sn-0.5 Ag of FIG. 6 with the fast cooled 58 Bi-45 Sn of FIG. 7. The improved solder has reduced grain size for both slow and fast cooling.

It is to be understood that the above-described embodiments are illustrative of only a few of the many possible specific embodiments of the invention. Numerous and varied other arrangements can be made by those skilled in the art without departing from the spirit and scope of the invention.

We claim:

1. A Pb-free solder alloy consists essentially of, by weight percent 40–60% Sn, about 0.25–0.5% Ag and the remainder Bi; said solder alloy has a strain-rate ductility in tensile testing at a strain rate of $10^{-2}$ $sec^{-1}$ which is at least 20% higher than that of a 58% Bi-42% Sn binary eutectic solder solidified at the same cooling rate.

2. The solder of claim 1 wherein said Ag content of said solder alloy is in the range about 0.25–0.5% by weight, and the melting point is below 150° C.

* * * * *